F. R. BESSANT.
DISK FOR DISK PLOWS.
APPLICATION FILED MAY 21, 1915.

1,214,882.

Patented Feb. 6, 1917.

Inventor:
Frederick R. Bessant,
by his Attorney.

UNITED STATES PATENT OFFICE.

FREDERICK R. BESSANT, OF ATKINSON, ILLINOIS, ASSIGNOR OF ONE-HALF TO HARLEY J. PECK, OF ATKINSON, ILLINOIS.

DISK FOR DISK PLOWS.

1,214,882.  Specification of Letters Patent.  Patented Feb. 6, 1917.

Application filed May 21, 1915. Serial No. 29,596.

*To all whom it may concern:*

Be it known that I, FREDERICK R. BESSANT, a citizen of the United States, residing at Atkinson, in the county of Henry and State of Illinois, have invented certain new and useful Improvements in Disks for Disk Plows; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to disk plows. It has for its object to construct the disk so as to particularly adapt it for plowing heavy gumbo and waxy soil, and to cut dead grasses, corn stalks, and like trash so that the same will be prevented from climbing up the disk so as to accumulate about the plow beam and prevent the efficient working of the plow. To such end the invention consists in forming the peripheral or cutting edge of the disk with a series of scallops or recesses of a peculiar shape or configuration by which the forward or entering edge of the recessed portion will grasp the trash and draw it inwardly at a relatively sharp angle while the receding or rearwardly extending portion will gradually cut or sever the trash or corn stalks in the rotation of the disk. This peculiar formation of scallop or recess also insures the disk taking and holding a better grip on the heavy soil so as to tend to prevent the disk from being lifted up or out of the soil in plowing.

To the accomplishment of the foregoing the invention consists in the features hereinafter particularly described and then sought to be clearly defined by the claim, reference being had to the accompanying drawing forming a part hereof, and in which—

Figure 1:
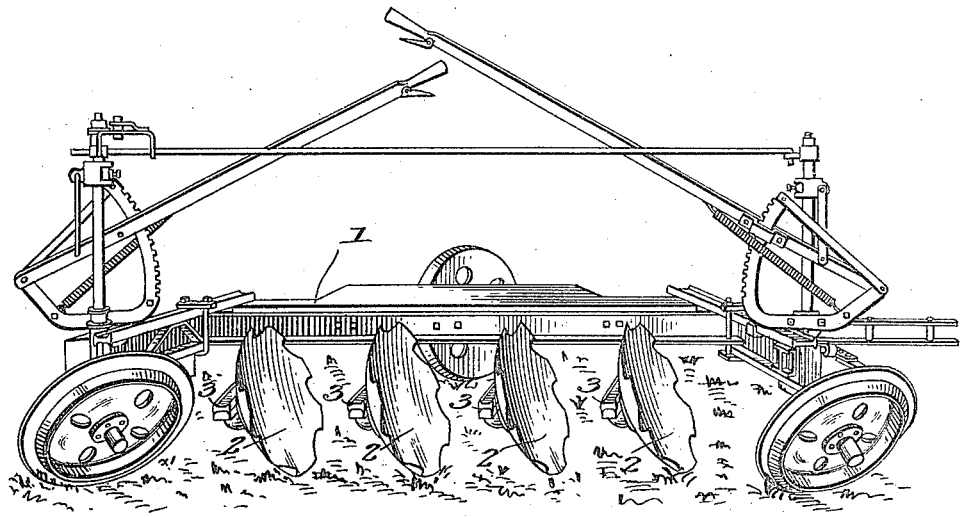
Figure 1 is a side view of a disk plow having disks embodying the invention.
Figure 2:
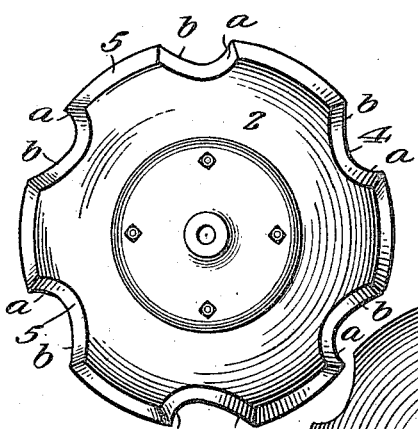
Fig. 2 is a side view of one of the disks, looking at the rear or convex side of the disk.
Figure 3:
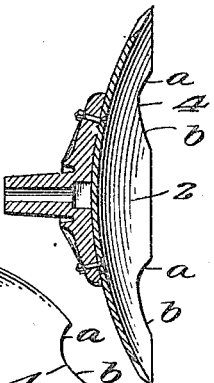
Fig. 3 is a vertical section through a disk.
Figure 4:
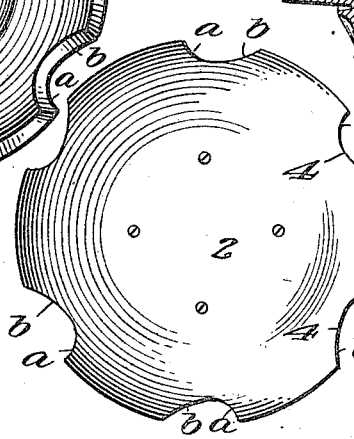
Fig. 4 is a side view of a disk looking at the front or concave face of the disk.

In the drawing the numeral 1 designates the plow frame, wheels, and operating levers, all of a well known construction, and 2 designates a number of disks, four being shown merely for purposes of illustration, and connected to arms 3 extending from the beam in any of the well known ways for permitting rotation of the disks. The disks are each formed with a series of scallops or recesses 4 at regular distances apart and of any desired number in each disk. These scallops or recesses are of a specially formed shape or configuration as illustrated, the same having a relatively sharp curve or arc at its forward or entering edge as at $a$ and a curve of a relatively greater arc from the shorter arc to the rear end of the recess, as at $b$, so as to present a gradually receding edge along such portion. With the scallop or recess formed as described, the forward portion thereof in the rotation of the disk will grasp and draw inwardly and downwardly any trash, such as dead grass and corn stalks, which will be cut or severed by the sharp edge of the recess and the gradually receding feature of the longer arc of the recess will prevent the trash from choking the disk and a tendency to lift the disk from the soil. The relatively sharp curve at the entering edge of the recess also tends to afford a better grip on heavy gumbo soil so that the disk will be held to the soil instead of having a tendency to be lifted out of the soil. The two characteristic features of the recess serve a useful purpose for the efficient plowing of the soil, and the cutting of the trash and preventing it from climbing the disk and accumulating about the beam and thus interfering with the efficient working of the plow. In actual plowing the advantages of the particular formation of the recesses in the disk have been demonstrated by satisfactory results attained.

The edge of the disk between the recesses as well as along the recesses is formed on a bevel as indicated at 5.

I have illustrated four disks applied to the plow but there may be a greater or less number, and the disks may be supported in any well known manner so as to rotate.

Having described my invention and set forth its merits, what I claim is—

In a disk plow, a disk formed with a scalloped or recessed peripheral cutting edge, the recesses having a relatively sharp curve or arc at one end and a relatively longer curve or arc extended from the sharper curve and toward the other end, both curves describing a concave line, substantially as described.

In testimony whereof I affix my signature in presence of two witnesses.

F. R. BESSANT.

Witnesses:
ROBERT H. GALBRAITH,
GEORGE VOELPEL.

Copies of this patent may be obtained for five cents each, by addressing the "Commissioner of Patents, Washington, D. C."